United States Patent [19]

Purcell, Jr.

[11] Patent Number: 4,995,691
[45] Date of Patent: Feb. 26, 1991

[54] ANGLED OPTICAL FIBER INPUT END FACE AND METHOD FOR DELIVERING ENERGY

[75] Inventor: Earl E. Purcell, Jr., Westfield, Mass.

[73] Assignee: Ensign-Bickford Optics Company, Conn.

[21] Appl. No.: 421,677

[22] Filed: Oct. 16, 1989

[51] Int. Cl.⁵ .............................................. G02B 6/26
[52] U.S. Cl. .............................. 350/96.15; 350/96.18; 350/96.29
[58] Field of Search ............... 350/96.15, 96.18, 96.19, 350/96.2, 96.29, 96.34

[56] References Cited

U.S. PATENT DOCUMENTS

| | | | |
|---|---|---|---|
| 4,452,505 | 6/1984 | Gasparian | 350/96.15 |
| 4,708,425 | 11/1987 | Gouali et al. | 350/96.18 |
| 4,790,618 | 12/1988 | Abe | 350/96.15 |
| 4,867,520 | 9/1989 | Weidel | 350/96.18 |
| 4,911,516 | 3/1990 | Palfrey et al. | 350/96.19 |

Primary Examiner—John D. Lee
Assistant Examiner—John Ngo
Attorney, Agent, or Firm—Donald J. Hayes; R. William Reinsmith

[57] ABSTRACT

A fiber optic treatment probe (10) delivers laser light from a laser light source (11) through a diffuser (26). An input end face (30) of the fiber is angled with respect to a plane (36) normal to an optical axis (18) of the fiber. The end face angle is selected to excite desired modes of the fiber without exceeding the critical angle of the fiber, thereby producing a desired light output from the diffuser.

18 Claims, 4 Drawing Sheets

ANGLED OPTICAL FIBER INPUT END FACE AND METHOD FOR DELIVERING ENERGY

FIELD OF THE INVENTION

This invention relates to fiber optic components and more particularly to fiber optic treatment probes for use in Photodynamic Therapy.

BACKGROUND OF THE INVENTION

Photodynamic Therapy involves the use of photo-activated chemicals for the treatment of a variety of serious diseases such as cancer. In practice, a photo-activated chemical, e.g. Photofrin by Quadra Logic Technologies, Inc., is injected into the patient, and accumulates in the cancer cells. A period of time later, normally 2 days, laser light is delivered to the cancer site through a diffusing tip of a fiber optic treatment probe to activate the chemical, and treat the cancer.

Typically, laser light is supplied by a medical laser, e.g., a high power argon laser pumping a dye laser head, to the treatment probe through a focusing lens and a coupling fiber (jumper). The light generated by these lasers is in the form of a guassian beam having a small launch angle (output angle), typically 10°, and having a wavelength of approximately 630 nanometers (nm).

The treatment probe consists of a length of fiber optic cable with a connector at one end for coupling the light from the laser, or a jumper, to the fiber, and a diffusing tip at the other end through which laser light is diffused and delivered to the patient. There are three types of diffusing tips: cylinder diffusers, sphere diffusers, and microlenses. Each type of diffuser requires a different light power level and time duration for treatment based on calculations by the clinician. The type of diffuser used for treatment is selected following a given protocol based on the type of treatment and the location of the treatment area.

Normally, it is desirable to have a uniform power distribution of laser light leaving the diffuser. The uniform power distribution provides maximum treatment efficiency without damaging (burning) healthy tissue due to areas of high power density. However, because the output angle of the light beam leaving the laser is small, mostly forward projecting lower order modes of the treatment probe fiber are excited during light transmission, and the resulting high density of lower order modes in the diffuser cause an uneven power distribution of the light leaving the diffuser. Another problem caused by the high number of lower order modes is that most of the light projects to the tip of a cylinder diffuser or is focused in a small area of a sphere diffuser or microlens, thereby causing the area of high power density. Hot spots developed in the areas of high power density in the diffuser can cause burning and shorten the useful life of the treatment probe.

The addition of a coupling fiber (jumper) between the laser and the treatment probe tends to mode mix the laser light to some extent so that when the light exits the jumper it has expanded into higher order modes, e.g., 28° full angle. However, treatment fibers normally have more higher order modes available, e.g., 42° full angle, than are filled by the addition of the jumper. In addition, The jumper increases light losses, resulting in reduced power delivered to the diffuser.

There are a number of other known methods for exciting higher order modes of light delivered to a diffuser. A first method is to force a bend in the fiber, thereby causing mode mixing and the resultant filling of higher order modes. However, there is no way to predict which higher order modes are filled, and the stess on the fiber can cause breaks, shortening the life of the fiber.

A second method is to form the treatment probe by butting a diffuser of sapphire against a flat and polished end of a fiber. The light mixes modes as it enters the diffuser resulting in a more uniform power distribution leaving the diffuser. However, there are a number of problems associated with this method. Hot spots are formed at the junction between the diffuser and the fiber. The junction tends to be weaker than the remainder of the probe, and the length of a sapphire cylinder diffuser is limited because of the potential for breakage.

A third method is to taper an end of the fiber into a conical shape and insert that end into a diffuser having a cylindrical shaped aperture. The angle at the end of the fiber induces light loss in a controlled manner, filling higher order modes and resulting in a more even power distribution of light diffused. However, the tip of the fiber still retains low order modes causing high power density and local hot spots. In addition, the length of the probe is limited.

It is therefore a principal object of the present invention to provide an optical fiber structure to control the light modes excited in an optical fiber of a fiber optic treatment probe, thereby eliminating areas of high power density in a light diffuser of the treatment probe, and allowing control of the output light power distribution from the diffuser.

It is another object of the invention to provide a fiber optic probe for direct coupling to a laser light source to eliminate the need for a coupling fiber (jumper) and the associated light losses from the treatment fiber, thereby increasing the light power delivered to the diffuser.

It is a further object of the present invention to provide a fiber optic treatment probe capable of providing a uniform light power distribution from the diffuser.

It is another object of the present invention to provide an improved fiber optic probe that is economical to manufacture and facile in its use.

Other objects of the invention will be in part obvious and in part pointed out in more detail hereinafter A better understanding of the objects, advantages, features, properties and relations of the invention will be obtained from the following detailed description which sets forth illustrative embodiments indicative of the various ways in which the principles of the invention are employed.

SUMMARY OF THE INVENTION

A fiber optic probe constructed according to the present invention, comprises a length of optical fiber having an input end for coupling the fiber to a laser light source which emits light at a launch angle (output angle) with respect to an optical axis of the probe, and an output end having a diffuser for dispersing the laser light. An end face of the input end is angled with respect to a plane normal to the optical axis of the probe, the angle being selected for exciting desired light modes in the fiber.

The present invention represents an advancement over previous treatment probes because the power distribution of the light emanating from a diffuser of the treatment probe can be predicted based on the laser launch angle, the material characteristics of the fiber, and the end face angle of the treatment probe, thereby allowing selection of an end face angle which results in a uniform power distribution of light emanating from the diffuser, and which eliminates hot spots formed by areas of high power density in the diffuser. A jumper is no longer needed to excite higher order modes, thereby resulting in greater light power delivered to the diffuser because of reduced light losses, and also resulting in the reduction of the overall cost of using a treatment probe. In addition, the diffuser can be formed directly on the fiber, thereby eliminating hot spots at the diffuser/fiber interface, allowing for the use of stronger diffusers, and further reducing the costs of manufacturing the probe.

DETAILED DESCRIPTION OF CERTAIN PREFERRED EMBODIMENTS

Figure 1:
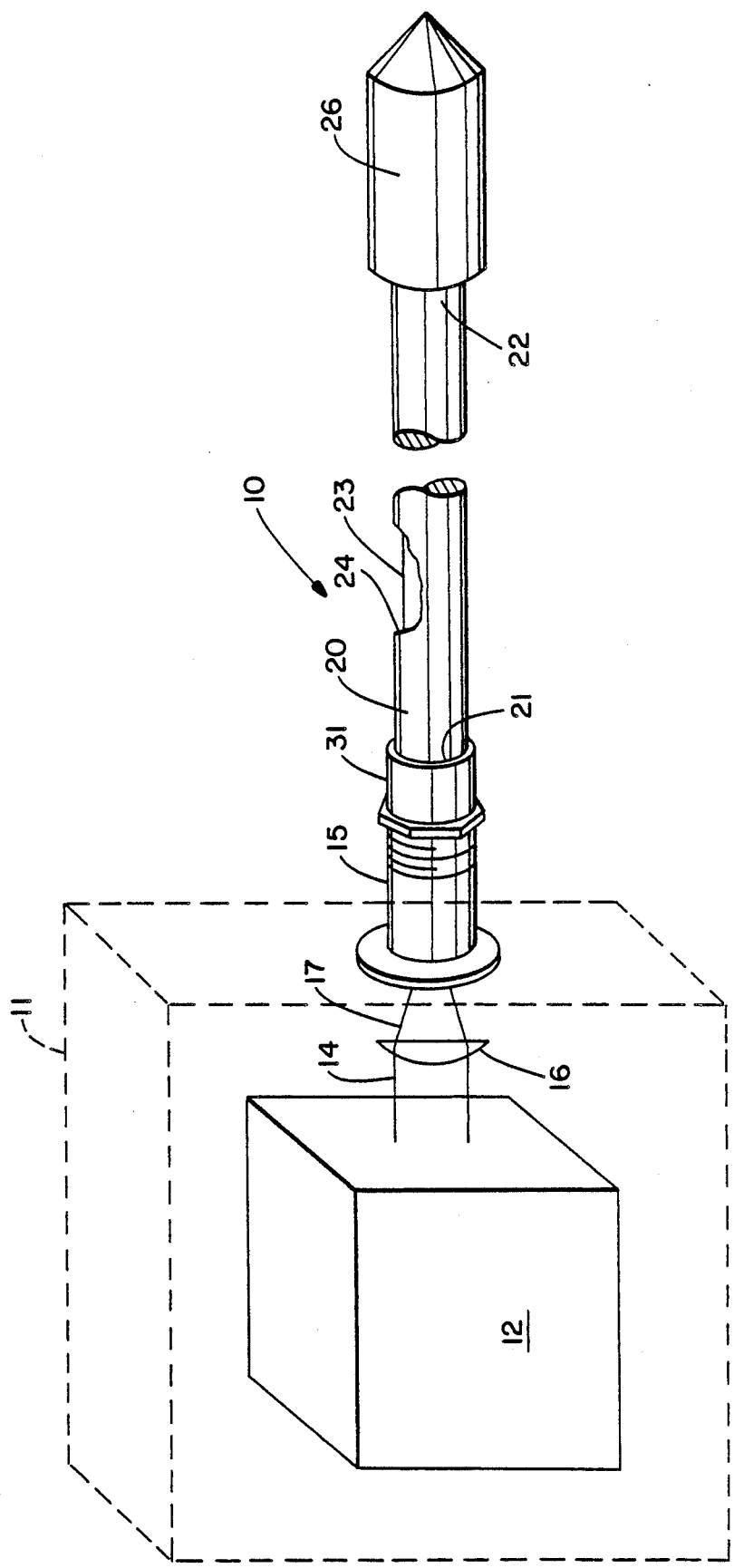
FIG. 1 is a perspective, partial cutaway view of a fiber optic treatment probe of the present invention in relation to a laser light source.

Referring to FIG. 1, a fiber optic treatment probe 10 is shown connected to a laser light source 11 such as a medical laser. The laser light source consists of a known type laser 12, e.g., a high powered argon laser pumping a dye laser head, for producing a laser light beam 14 which is focused at an output connector 15 by a focusing lens 16. The light beam of a medical laser 11 typically has a gaussian power distribution with a wavelength of aproximately 630 nm with a corresponding treatment probe output power level of 4 watts. The light beam exits the laser with a cone 17 which is coaxial with respect to the optical axis 18 of FIG. 2 of the treatment probe, and has a half angle (launch angle) 19 of FIG. 2 (theta X), with respect to the optical axis 18.

Referring again to FIG. 1, the treatment probe 10 consists of a length of optical fiber 20 having an input end 21 and an output end 22. The optical fiber is of conventional structure and consists of a light guiding core 23 surrounded by cladding material 24. The cladding material has an index of refraction lower than that of the core material, thereby enabling suitably directed light rays within the core to be reflected through the length of the core. Any known type of optical fiber may be utilized in the treatment probe of the present invention, e.g., optical fibers with cores of glass, fused silica, or a polymer such as acrylate or methacrylate, surrounded by a glass or polymer cladding. Light rays entering the fiber are refracted, and propagate at an internal angle (theta Y) 25 of FIG. 2 with respect to the axis of the fiber. Each internal angle at which the light rays propagate corresponds to a mode of the fiber. The numerical aperture (N.A.) of the fiber determines the critical angle of the fiber, which is the largest internal angle (highest order mode) at which light can propagate in the fiber. If the internal angle of a light ray exceed the critical angle, the ray will not be reflected into the core by the cladding, thereby resulting in reduced light power in the fiber. The critical angle of the fiber corresponds to a maximum acceptance angle of the fiber, which is the launch angle into a fiber input end having a planar end face normal to the optical axis of the fiber producing a light ray in the fiber at an internal angle equal to the critical angle. Preferably, the fiber is 0.400 millimeter core diameter HCS ® standard N.A. fiber having a core and cladding refractive index of 1.46 and 1.41 respectively, and having an N.A. of 0.37 corresponding to a maximum acceptance angle of 22° (half angle).

A diffuser 26, e.g., a cylinder diffuser, is formed on the fiber output end 22. The diffuser is formed by first removing a section of cladding at the fiber output end exposing the fiber core, and then replacing the cladding section with a material having a higher or equal index of refraction than the core material, e.g. glass or polymer. The replacement material is impregnated with a diffusing medium, e.g., micron sized glass beads, aluminum oxide or zinc oxide. The higher or equal index of refraction replacement material allows the light transmitted through the fiber core to be reflected out of the diffuser. The diffusing material disperses the light refracted out of the core.

Figure 2:
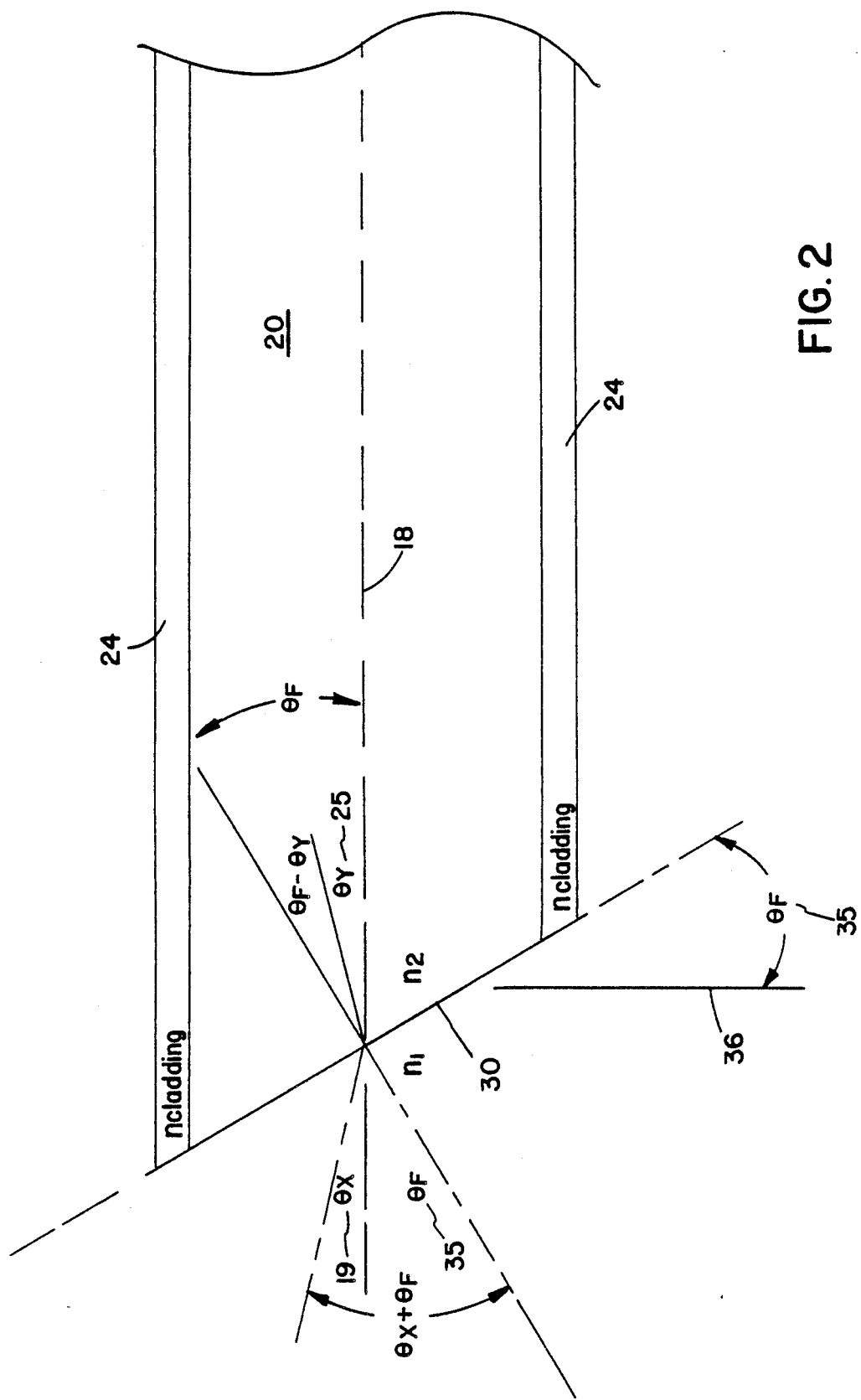
FIG. 2 is a schematic view of an angled input end face of the fiber optic probe of FIG. 1.

The fiber input end 21 has an angled end face 30 of FIG. 2, for admitting light into the fiber core, and an input connector 31 of FIG. 1, for engagement with the laser output connector 15, for coupling the treatment probe 10 to the medical laser 11.

Referring to FIG. 2, the fiber end face 30 has an end face angle (theta F) 35 with respect to a plane 36 normal to the axis of the fiber. Angle theta F 35 is selected so that higher order modes of the fiber are excited by the laser light, thereby producing a more uniform power distribution of the light emanating from the diffuser and preventing the formation of hot spots in the diffuser. Angle theta F 35 is limited so that the critical angle is not exceeded, thereby limiting light escape from the fiber.

The modes excited in the fiber can be predicted by the following relationship (from Snell's law):

$$\theta_Y = \theta_F - \sin^{-1}\left(\frac{n_1}{n_2}\sin(\theta_F + \theta_X)\right)$$

wherein $n_1$ is the index of refraction of the surrounding media, and $n_2$ is the index of refraction of the fiber core.

This relationship is only theoretical and may be affected by various material purity and surface effects.

The operation of the invention is best understood by example. If a fiber optic probe having a core index of refraction of 1.46 and an input end face angle (theta F) of 0°, is used with a laser having a launch angle (theta X) of 10° full angle, the modes excited in the fiber (theta Y) are listed below in tabular form:

| theta F | theta X | theta Y |
|---|---|---|
| 0° | 5° | −3.4° |
| 0° | 4° | −2.7° |
| 0° | 3° | −2.1° |
| 0° | 2° | −1.4° |
| 0° | 1° | −0.7° |
| 0° | 0° | 0° |
| 0° | −1° | 0.7° |
| 0° | −2° | 1.4° |

| theta F | theta X | theta Y |
| --- | --- | --- |
| 0° | −3° | 2.1° |
| 0° | −4° | 2.7° |
| 0° | −5° | 3.4° |

Figure 3:
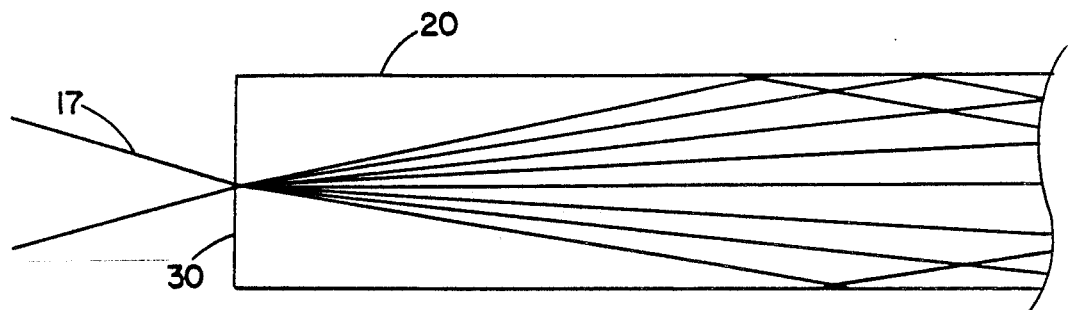
FIG. 3 is a schematic view of a treatment probe having an end face angle of 0°, and showing typical light modes excited in the fiber.

As shown FIG. 3, only forward projecting, lower order modes of the treatment fiber are excited. This results in a gaussian power distribution of the light in the fiber, as shown in illustration (a) of FIG. 6, resulting in an uneven distribution of light emanating from the diffuser.

If a fiber optic probe having an index of refraction of 1.46 and an input end face angle (theta F) of 10° is used with the same laser, higher order modes (theta Y) of the fiber are excited, as listed below in tabular form:

| theta F | theta X | theta Y |
| --- | --- | --- |
| 0° | 5° | −3.4° |
| 0° | 4° | −2.7° |
| 0° | 3° | −2.1° |
| 0° | 2° | −1.4° |
| 0° | 1° | −0.7° |
| 0° | 0° | 0° |
| 0° | −1° | 0.7° |
| 0° | −2° | 1.4° |
| 0° | −3° | 2.1° |
| 0° | −4° | 2.7° |
| 0° | −5° | 3.4° |

Figure 4:
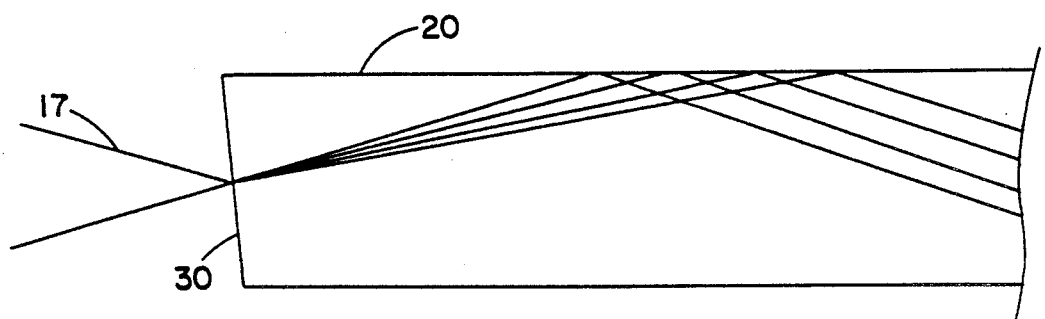
FIG. 4 is a schematic view of a treatment probe having an end face angle of 10°, and showing typical light modes excited in the fiber.
Figure 6A:
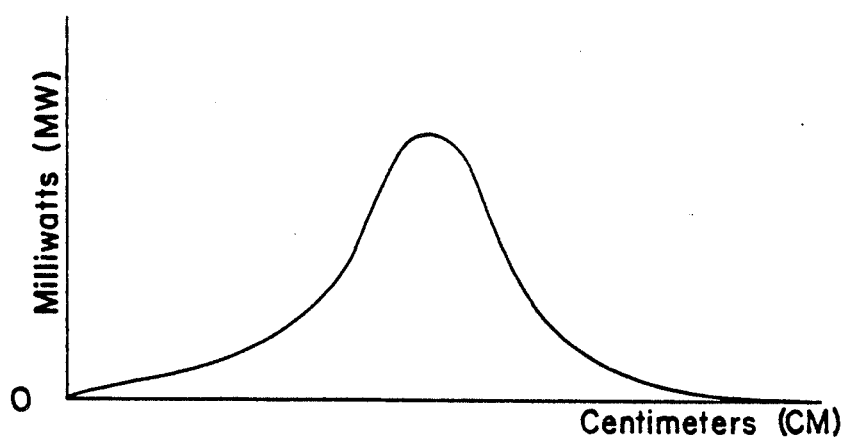
FIG. 6 is a graphical representation of the light power distribution in the fibers of FIGS. 3, 4 and 5.
Figure 6B:
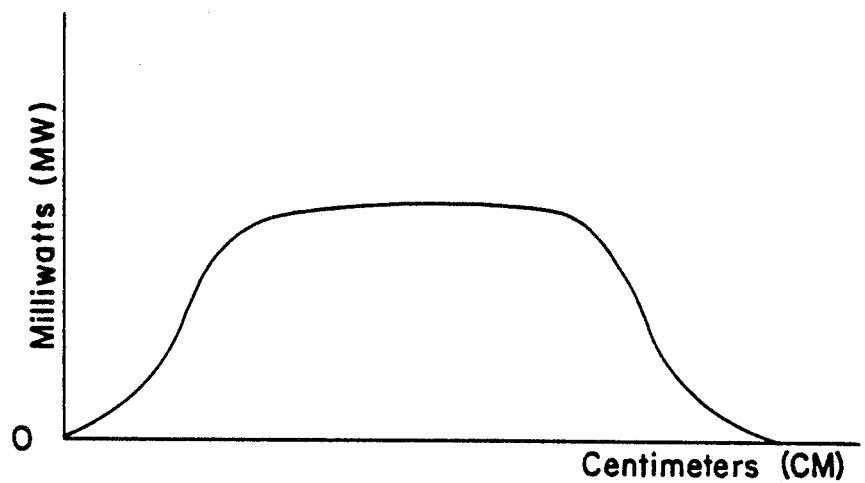
Figure 6C:
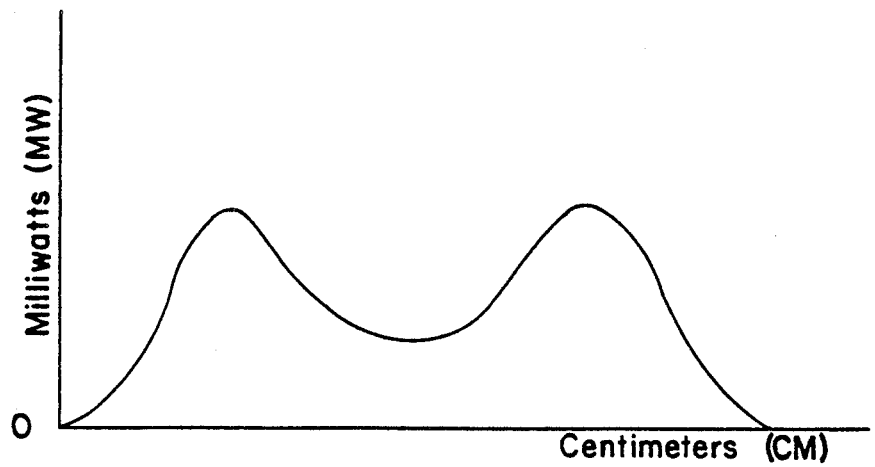

As shown in FIG. 4, higher order modes of the fiber are filled, and there is a more uniform distribution of light in the fiber as shown in illustration (b) of FIG. 6, resulting in a more even distribution of light emanating from the diffuser.

Figure 5:
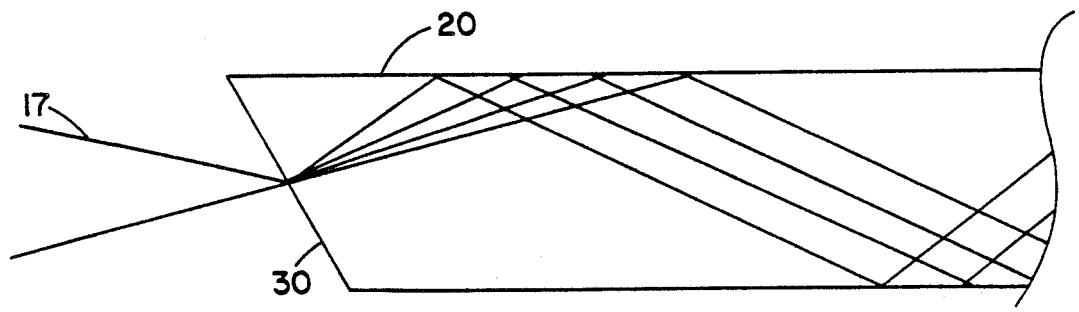
FIG. 5 is a schematic view of a treatment probe having an end face angle of 30°, and showing typical light modes excited in the fiber.

Referring to FIG. 5, if the fiber end face angle is further increased, even more higher order modes of the fiber are excited, and the resulting cross sectional power distribution of light in the fiber develops peaks, as shown in illustration (c) of FIG. 6.

The fiber in the example above has a maximum acceptance angle of 22° half angle. Therefore, the maximum end face angle (theta F) for use with the laser of the examples above, so as not to exceed the critical angle, is 35°.

By varying the fiber end face angle, the distribution of light emanating from the diffuser can be varied. Therefore, given a particular laser having a fixed launch angle, a probe input end face angle can be selected to give a desired output. Given the medical lasers currently in use, the fiber end face could range from 0.5° to 45°, depending on transmission requirements. For most application, an end face angle of between 5° and 30° is most desirable.

The treatment probe is illustrated as having a cylinder diffuser, however, the invention would work equally as well with a sphere diffuser or a micro lens. In addition, the fiber optic probe is shown coupled directly to the laser. However, the invention may also be used with a coupling fiber (jumper) between the probe and the laser.

Although the invention has been illustrated and described with respect to exemplary embodiments thereof, it should be understood by those skilled in the art that the foregoing and various other changes, omissions and additions may be made therein and thereto, without departing from the spirit and scope of the invention.

I claim:

1. A fiber optic probe for use with a laser light source having an axis of light at an output angle with respect to an optical axis of said probe, comprising:
   a length of optical fiber having a core and a cladding, said core having a range of available modes determined by a numerical aperture of said core, said core and said cladding each having an index of refraction, said core being selected with a higher index of refraction than said cladding, thereby allowing light to propagate the length of said fiber in the modes of said core;
   an output end at one end of said fiber having a diffuser for dispersing the light propagated through said fiber; and
   an input end at the other end of said fiber for coupling light from said laser into said fiber, said input end having an end face angle, said end face angle defined as the angle between a plane normal to said optical axis and the plane of the input end face, said end face angle being selected for exciting desired modes of said fiber, thereby producing a desired light distribution dispersed from said diffuser.

2. The fiber optic probe of claim 1 wherein said end face angle is between 0.5° and 45°.

3. The fiber optic probe of claim 1 wherein said diffuser is a cylinder diffuser.

4. The fiber optic probe of claim 1 wherein said diffuser is a sphere diffuser.

5. The fiber optic probe of claim 1 wherein said diffuser is a micro lens.

6. The fiber optic probe of claim 1 wherein said fiber has a numerical aperture of 0.37 corresponding to a maximum acceptance angle of 22° (half angle).

7. The fiber optic probe of claim 6 wherein said input end face angle is between 5° and 30°.

8. The fiber optic probe of claim 1 wherein said fiber has a numerical aperture of 0.48 corresponding to a maximum acceptance angle of 29° (half angle).

9. The fiber optic probe of claim 1 further comprising a coupling fiber for coupling said fiber input end to said laser.

10. A method of controlling the light distribution from a diffuser of a fiber optic probe, the diffuser being formed on a terminal end of a probe optical fiber for distributing light refracted out of the fiber, the method comprising the steps of:
   providing the probe optical fiber with a core and a cladding, said core having a range of available modes determined by a numerical aperture of the core, said core and said cladding each having an index of refraction, said core being selected with a higher index of refraction than said cladding, thereby allowing light to propagate the length of the fiber in the modes of said core;
   providing a laser light source having an axis of light at an output angle with respect to an optical axis of the fiber;
   providing a flat input end face on the fiber having an end face angle, said end face angle definded as the angle between a plane normal to said optical axis and the plane of the input end face; and
   coupling light from said laser light source into said input end face, whereby said end face angle controls the modes excited in said core, thereby controling the light distribution dispersed from the diffuser.

11. The method of claim 10 further comprising the step of selecting an input end face angle between 0.5° and 45°.

12. The method of claim 10 wherein the diffuser is a cylinder diffuser.

13. The method of claim 10 wherein the diffuser is a sphere diffuser.

14. The method of claim 10 whrein the diffuser is a micro lens.

15. The method of claim 10 further comprising the steps of:

providing a coupling fiber; and coupling said input end face to said laser through said coupling fiber.

16. The method of claim 10 wherein the fiber has a numerical aperture of 0.37 corresponding to a maximum acceptance angle of 22° (half angle).

17. The method of claim 16 further comprising the step of selecting an input end face angle between 5° and 30°.

18. The method of claim 10 wherein the fiber has a numerical aperture of 0.48 corresponding to a maximum acceptance angle of 29° (half angle).

* * * * *

UNITED STATES PATENT AND TRADEMARK OFFICE
CERTIFICATE OF CORRECTION

Page 1 of 3

PATENT NO. : 4,995,691

DATED : February 26. 1991

INVENTOR(S) : Earl E. Purcell, Jr.

It is certified that error appears in the above-identified patent and that said Letters Patent is hereby corrected as shown below:

Column 2, line 3
    as reads "stess" should read --stress--

Column 5, lines 20 - 30
Should read see attached sheet (tabular form).

UNITED STATES PATENT AND TRADEMARK OFFICE
CERTIFICATE OF CORRECTION

PATENT NO. : 4,995,691
DATED : February 26, 1991
INVENTOR(S) : EARL E. PURCELL, JR.

It is certified that error appears in the above—identified patent and that said Letters Patent is hereby corrected as shown below:

should read--

| theta F | theta X | theta Y |
|---|---|---|
| 10° | 5° | -0.2° |
| 10° | 4° | 0.5° |
| 10° | 3° | 1.1° |
| 10° | 2° | 1.8° |
| 10° | 1° | 2.5° |
| 10° | 0° | 3.1° |
| 10° | -1° | 3.8° |
| 10° | -2° | 4.5° |
| 10° | -3° | 5.2° |
| 10° | -4° | 5.9° |
| 10° | -5° | 6.6° |

UNITED STATES PATENT AND TRADEMARK OFFICE
CERTIFICATE OF CORRECTION

PATENT NO. : 4,995,691

DATED : February 26, 1991

INVENTOR(S) : Earl E. Purcell, Jr.

It is certified that error appears in the above-identified patent and that said Letters Patent is hereby corrected as shown below:

| theta F | theta X | theta Y |
|---|---|---|
| 10° | -5° | 6.6° |

Signed and Sealed this

Thirteenth Day of October, 1992

Attest:

DOUGLAS B. COMER

*Attesting Officer*   Acting Commissioner of Patents and Trademarks